United States Patent [19]
Fawcett et al.

[11] 3,922,942
[45] Dec. 2, 1975

[54] APPARATUS FOR CUTTING UP TIRE CASINGS
[75] Inventors: William E. Fawcett, Latrobe; Alan L. Echtenkamp, Greensburg, both of Pa.
[73] Assignee: Kennametal Inc., Latrobe, Pa.
[22] Filed: Sept. 6, 1974
[21] Appl. No.: 503,644

[52] U.S. Cl. .................. 83/620; 83/623; 83/694; 83/923; 83/925 R
[51] Int. Cl.² ................................. B26D 15/02
[58] Field of Search ................. 83/618–623, 83/694, 923, 925 R, 636

[56] References Cited
UNITED STATES PATENTS
1,405,401  2/1922  Eger..................................... 83/620

Primary Examiner—J. M. Meister
Attorney, Agent, or Firm—Melvin A. Crosby

[57] ABSTRACT

An apparatus for cutting tire casings into smaller pieces for disposal of the tire casings by chemical processing, or by burning or the like. The apparatus comprises opposed knife sets relatively moveable toward and away from each other and adapted for receiving the tire casing therebetween when separated and for cutting the tire casing into segments when moved toward each other. The apparatus includes a support for holding the tire casing during cutting and the cutting instrumentalities comprise opposed knife sets which are inclined relative to each other so as to perform a sort of scissor cut on the tire casing at a plurality of circumferentially spaced regions thereabout.

8 Claims, 5 Drawing Figures

APPARATUS FOR CUTTING UP TIRE CASINGS

The present invention relates to an apparatus for cutting up tire casings to facilitate chemical processing or disposal thereof and is especially concerned with such an apparatus which is relatively simple and inexpensive and which has substantial capacity.

The chemical processing or disposal of worn tire casings has always represented a problem due to the physical nature of a tire casing. If such casings are employed for land fill operations, the casings tend to work upwardly in the ground and come to the surface, probably due to the air entrapped within the confines of the casing, and this can represent a problem.

In other instances, the tire casings are burned and the size and shape of tire casings represents a problem in this respect also.

It is also the case that certain materials in the casing, such as oil and carbon black and the like can be recovered by chemical processes and, in this event, also, the size and shape of the tire casings represent a disadvantage.

The present invention proposes an apparatus in which tire casings can be cut up into fairly small pieces which can then be processed further, for recovery purposes or utilized for burning or land fill operations without the disadvantages that attend the treatment of whole tire casings.

BRIEF SUMMARY OF THE INVENTION

According to the present invention, a pair of support members, which may be in the form of parallel plates, are relatively moveable toward and away from each other while cutting knives mounted on the opposed faces of the plates are operable to engage a tire casing between the plates and to sever the tire casing into short circumferential sections.

The knives are arranged in opposed pairs and radiate from a center near the upper edge of the plates and are circumferentially spaced about 20° from each other. The knives incline relative to each other in the longitudinal direction of the knives so as to be closer at the top than at the bottom and, thus, carry out a sort of scissor type cutting action on the tire casing with the inclination of the knives to each other distributing the cutting load and also preventing the tire casing from slipping out from between the knives.

Support members near the lower ends of the knives support the casing during a cutting operation so that the casing is trapped between the knives and the support arrangement during a cutting operation.

The tire casing is advantageously split into halves along a plane perpendicular to the axis of the tire prior to the cutting up of the tire in segments, but it is, also, possible to treat whole casings in conformity with the present invention.

The exact nature of the present invention will become more clearly apparent upon reference to the following detailed specification taken in connection with the accompanying drawings in which.

DETAILED DESCRIPTION OF THE INVENTION

Figure 1:
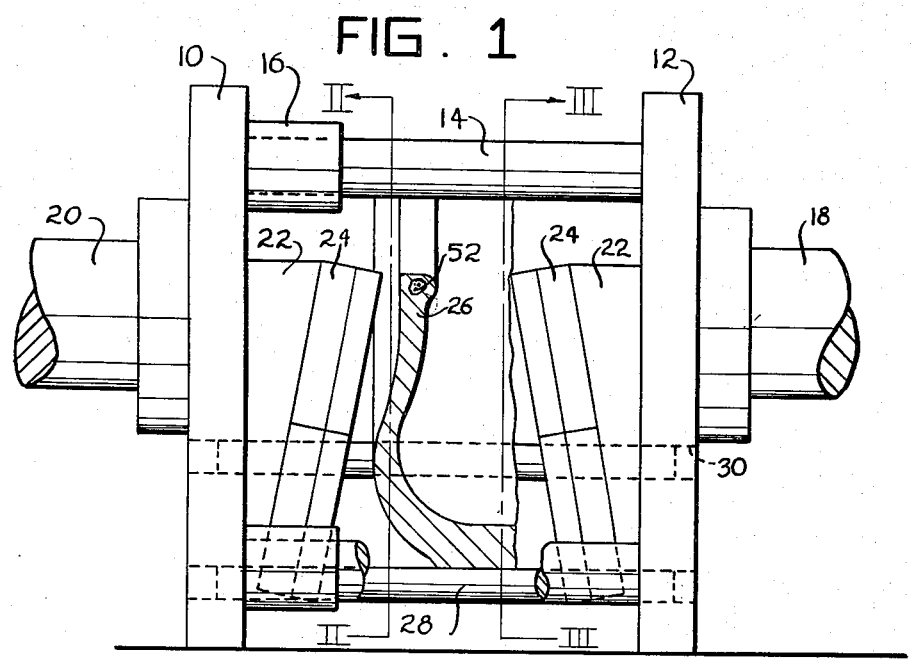
FIG. 1 is a side view of a typical apparatus according to the present invention.
Figure 4:
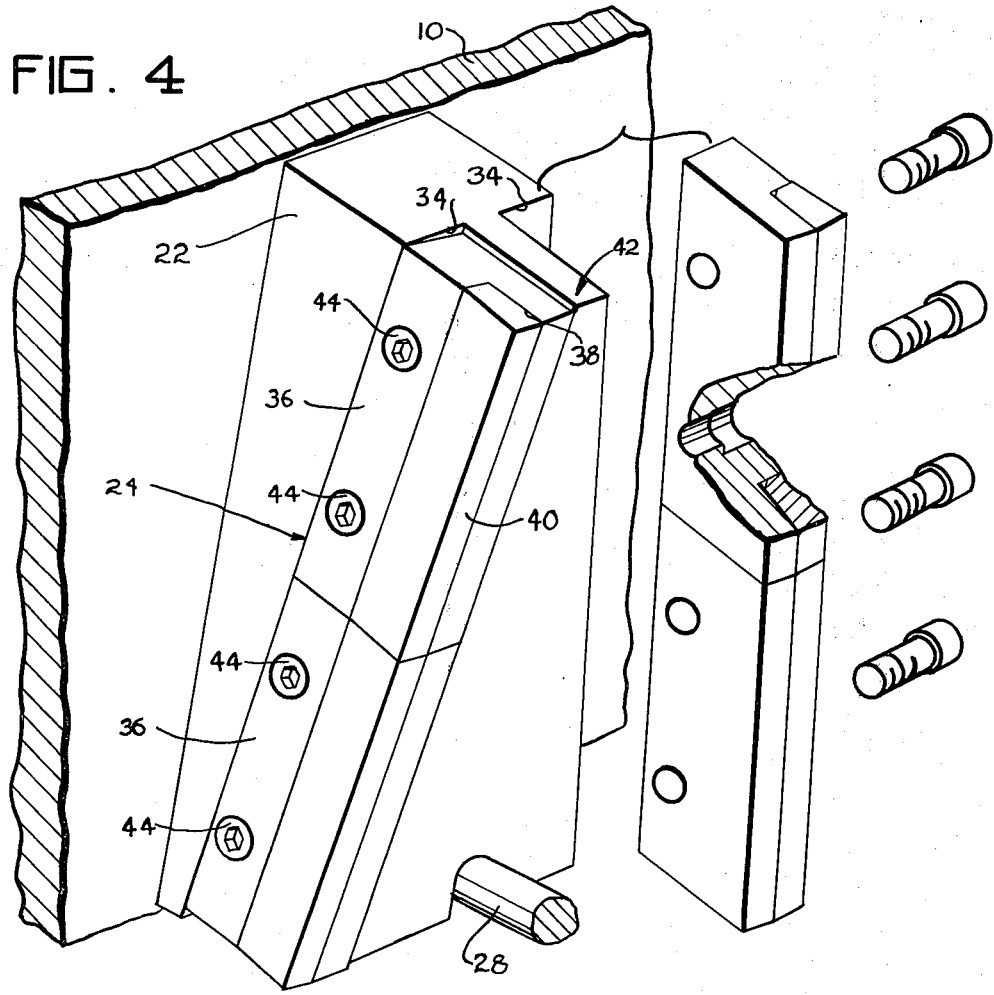
FIG. 4 is a perspective view showing the manner in which knives are mounted on the support plates therefor.

Referring to the drawings somewhat more in detail, in FIG. 1, it will be seen that the apparatus comprises opposed plates 10 and 12 with one of the plates carrying guide rods 14 and the other of the plates having bushings 16 in which the guide rods are slidable. The plates are guided relative to each other during reciprocation by the guide rods and bushings.

At least one plate, say, plate 12, has a ram 18 connected thereto for moving plate 12 toward and away from plate 10. Plate 10, optionally, can also have a ram 20 connected thereto so that the plates are both powered in the closing direction.

Each plate, on the side thereof facing the other, has support members 22 mounted thereon and each support member carries knives 24. It will be noted that the knives 24 incline toward each other in the upward direction in FIG. 1, and this prevents a tire casing half, as indicated at 26 in FIG. 1, from slipping upwardly between the knives during a cutting operation.

One of the plates 10, 12, for example, plate 10, also has support rods 28 connected thereto and extending parallel to guide rods 14 and slidable in bores 30 in plate 12. These rods, which are three in number as will be seen in FIGS. 2 and 3, are provided for supporting a tire casing placed in the apparatus from beneath so that it is merely necessary to set a tire casing into the apparatus and then close the plates 10 and 12 toward each other for carrying out a cutting operation.

Figure 2:
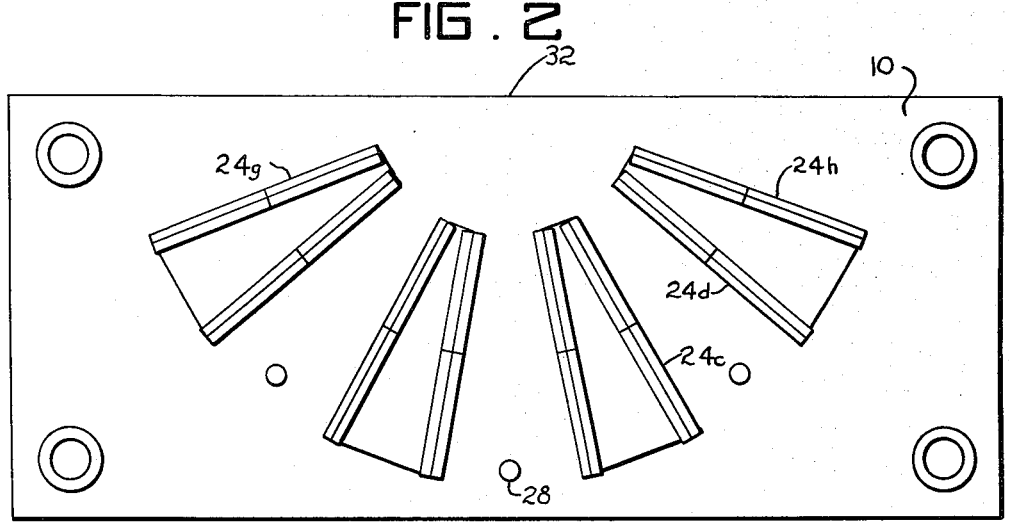
FIGS. 2 and 3 are transverse sections indicated on lines II—II and III—III of FIG. 1.
Figure 3:
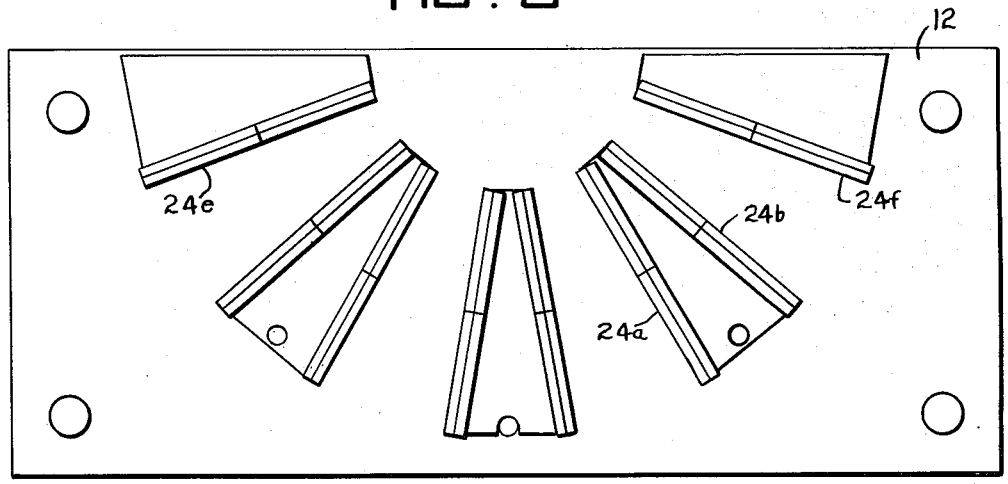

As will be seen in FIGS. 2 and 3, the knives 24 are arranged in pairs on plate 10 with each pair of knives mounted on a respective support and with the supports being disposed in circumferentially spaced relation about 40° apart as measured from an imaginary center point 32 near the upper edge of plate 10.

Turning to FIG. 3, it will be seen that there are similar knife supports provided on plate 12 on which pairs of knives are mounted with each pair of knives so mounted on plate 12 of FIG. 3 adapted to be received in the space between a pair of knives on plate 10. For example, in FIG. 3, the knives marked 24a and 24b are adapted for being received between the knives marked 24c and 24d in FIG. 2.

The plate 12 has two further knives mounted thereon at 24e and 24f and these knives cooperate with the circumferentially outermost knives 24g and 24h respectively on plate 10.

The support members 22 previously referred to will be seen to comprise blocks of substantial proportions fixed to the respective plates as by cap screws and dowell pins with each support member 24 having a notch 34 in each side adapted for receiving a pair of knife members in end to end relation.

Each of the knives 24 consists of identical knife members 36, each comprising a steel block having a notch 38 in one corner in which is brazed a hard wear resistant cutting element 40 formed, for example, of a cemented hard metal carbide such as tungsten carbide.

Each of the knife members 36 is bolted to a central rib 42 of the respective support member as by cap screws 44 which are preferably received in countersunk holes in the steel part of the respective knife member 36.

Figure 5:
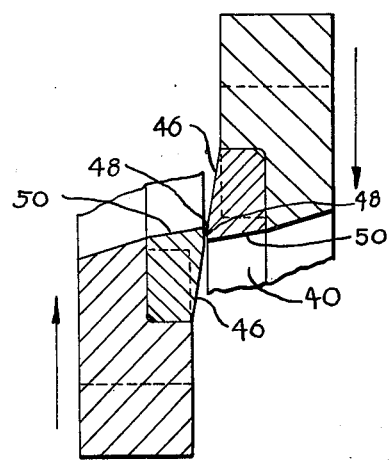
FIG. 5 is a schematic plan view showing how the knives cooperate with one another for shearing the tire casing into circumferential sections.

FIG. 5 illustrates schematically the manner in which the knives cooperate during a cutting operation on a tire casing. Each cutting element 40 of each knife member is provided with a face 46 on the side toward the knife member of the other plate with which it cooperates and inclines backwardly so as to provide clearance between the cooperating knife members while, at the leading corner of each insert, there is formed a flat 48 substantially parallel to the direction in which the respective knife member moves.

The flats 48 of each pair of cooperating knife members pass quite close to each other while carrying out the actual cutting operation on a tire casing. The side of each cutting element 40 which faces in the direction of cutting, said sides being indicated at 50, incline rearwardly somewhat so that the leading edge of each flat portion 48 is sharp and the tire casing will thereby readily be cut by the cutting elements when they are closed together.

As mentioned before, it is preferable for tire casings to be cut in half in a plane perpendicular to the axis of the tire and these tire sections are then placed in the device according to the present invention and cut into smaller circumferential segments.

Depending upon the size of the tire, the apparatus according to the present invention will cut from about 90° to 120° of the circumference of the tire at one time. In any event, a portion of a tire large enough to be cut into smaller pieces can always be placed in the apparatus and supported by support means 28 while the cutting operation takes place.

The apparatus according to the present invention operates relatively rapidly and reduces tire casings quickly to a preferred size for disposal, burning, or chemical processing of the casings.

It will be noted that, due to the use of hard carbide material for the cutting elements, there is no problem encountered when a bead core, such as is indicated at 52, in FIG. 1, is to be cut through. Such bead cores can cause considerable problems if a tire is chemically processed or burned without being cut up, but with the bead core cut into short segments by the apparatus of the present invention, these problems are eliminated.

Modifications will be made within the scope of the appended claims.

We claim:

1. In a machine for cutting tire casings into circumferential segments; a pair of spaced support plates adapted for receiving a tire casing to be cut therebetween, knife members upstanding from the sides of the plates which face each other disposed in circumferentially spaced relation about a tire casing between the plates and substantially radial to the tire casing, each knife member on one plate adapted for cooperation with a knife member on the other plate to make a substantially radial cut through a tire casing placed between said plates when the plates are moved toward each other.

2. A machine according to claim 1 in which said plates are substantially vertical and move toward and away from each other in the horizontal direction, the segments of a tire cut by the knife members on said plates dropping downwardly from between said plates after a cutting operation.

3. A machine according to claim 1 which includes guide means engaging said plates and guiding said plates during movement of said plates toward and away from each other.

4. A machine according to claim 1 in which said knife members are spaced apart at about 20 degree intervals.

5. A machine according to claim 1 which includes knife member support blocks on said plates each having means at each side for supporting a knife member, the support blocks on one plate being staggered relative to the support blocks on the other plate.

6. A machine according to claim 1 in which said knife members incline toward each other in the radially inward direction of a tire casing placed between said plates.

7. A machine according to claim 1 which includes means for supporting a tire casing within the radial range of said knife members, said knife members inclining toward each other in the radially inward direction of the casing.

8. A machine according to claim 7 which includes guide rods on one plate and apertures in the other plate receiving said rods for guiding said plates during relative reciprocating movement of the plates, said means for supporting a tire casing comprising pins on at least one plate near the radially outer ends of said knife members.

* * * * *